United States Patent [19]

Connery et al.

[11] 3,917,524

[45] Nov. 4, 1975

[54] ELECTROCHEMICAL CELL ASSEMBLY

[75] Inventors: James G. Connery, North Wales; George R. Moreland, Green Lane; Victor S. Underkoffler, Doylestown, all of Pa.

[73] Assignee: Leeds & Northrup Company, North Wales, Pa.

[22] Filed: May 10, 1974

[21] Appl. No.: 469,141

[52] U.S. Cl.............. 204/195 R; 204/274; 204/275
[51] Int. Cl.² .................. G01N 27/28; G01N 27/46
[58] Field of Search ........ 204/195 R, 195 P, 195 G, 204/195 L, 195 M, 195 C, 195 F, 195 T, 1 T, 274, 239, 275; 324/29, 30 R, 30 B

[56] References Cited
UNITED STATES PATENTS

| | | | |
|---|---|---|---|
| 1,913,429 | 6/1933 | Crawford | 204/239 |
| 3,328,204 | 6/1967 | Grubb | 136/86 |
| 3,428,542 | 2/1969 | Komhyr | 204/195 |
| 3,728,244 | 4/1973 | Cooley | 204/275 X |
| 3,824,167 | 7/1974 | Oswin et al. | 204/195 R |
| 3,824,168 | 7/1974 | Oswin et al. | 204/195 R |

FOREIGN PATENTS OR APPLICATIONS 2,024,008  11/1970  Germany.......................... 204/195 T

*Primary Examiner*—G. L. Kaplan
*Attorney, Agent, or Firm*—William G. Miller, Jr.; Raymond F. MacKay

[57] ABSTRACT

An electrochemical cell assembly of the flow-through type having an indicator electrode, a counter electrode, and a reference electrode. The cell is characterized by the inclusion of heaters and temperature sensing devices precisely to adjust the temperature of a fluid prior to passage thereof through the electrode chamber of the cell and precisely to control the temperature of the electrode chamber. The cell assembly is comprised of a plurality of components in a stacked array and further characterized by a pair of electrode surfaces of substantial cross sectional area in face-to-face relation forming walls of the cell and means to delineate the active surface area of each electrode.

3 Claims, 9 Drawing Figures

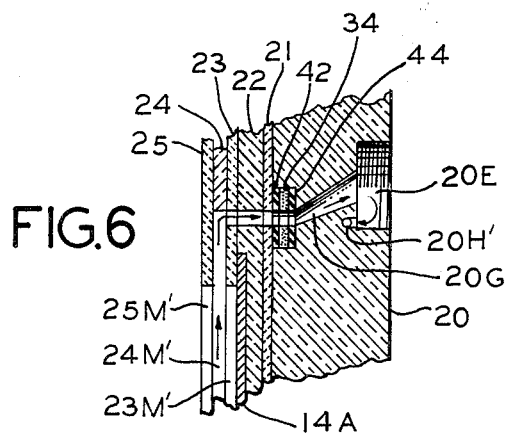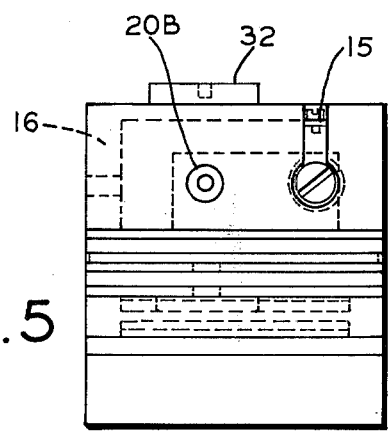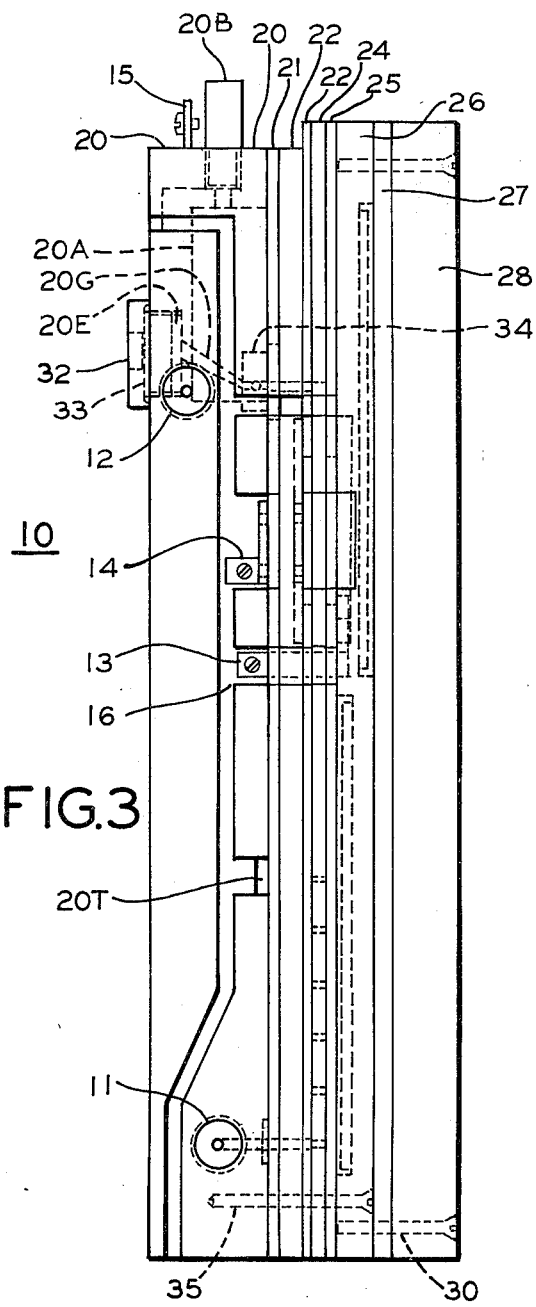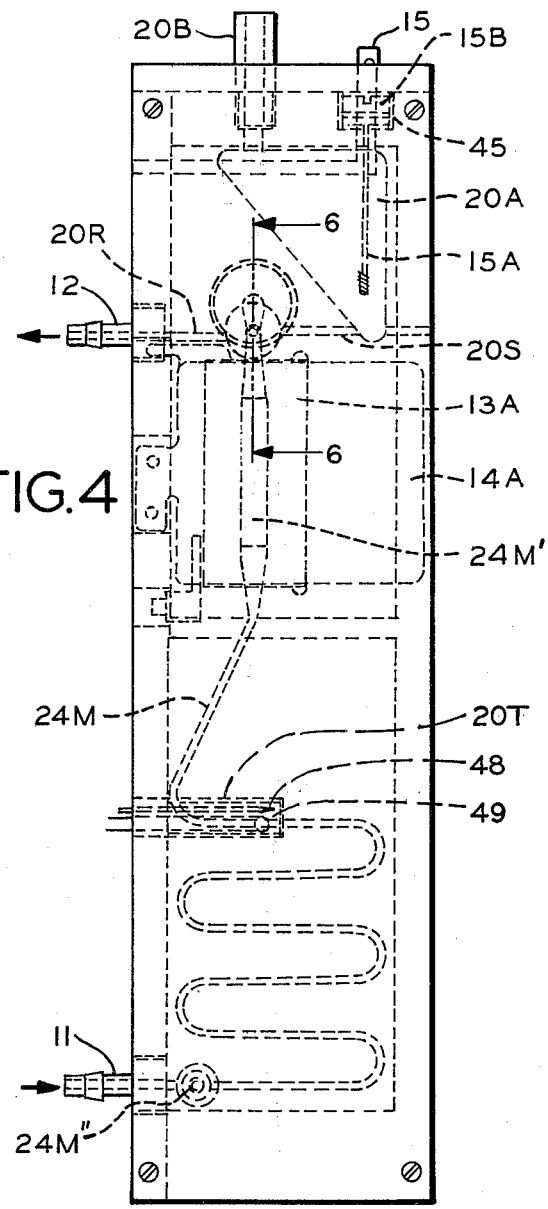

ELECTROCHEMICAL CELL ASSEMBLY

BACKGROUND OF THE INVENTION

1. Field of the Invention

This invention relates to apparatus for making electrochemical measurements. Such apparatus may be found in U.S. Patent Office subclass relating to Chemistry, Electrical and Wave Energy, Processes and Products Electrolysis, Apparatus Electrolytic and/or subclasses relating to Electricity, Measuring and Testing, Electrolytic, pH Measurement or Conductivity.

2. Description of the Prior Art

For a long time there has been a continuing effort to produce better cells for making electrochemical measurements. U.S. Pat. Nos. 3,776,832; 3,755,124; and 3,434,045 are examples of efforts to produce cells of subject type having an electrode chamber of small volume and short residence time for fluid in the cell, a cell which is unaffected by the presence of gas bubbles in the fluid stream, flow rate, and ambient temperature change. U.S. Pat. No. 3,623,960 is illustrative of an electrochemical cell structure of the type including a membrane which is semi-permeable. The cell is disposed in a jacketed vessel through which is circulated a fluid at constant temperature for the purpose of effecting measurements within a specific temperature range.

For some applications; such as; for example, in arrangements for more precise determination of glucose by the detection of Hydrogen Peroxide by amperometric methods and apparatus, a cell having even better performance characteristics is required.

Applicants have discovered a form of cell construction which results in a cell having a rapid response, good linearity, is reasonably free of effects produced by gas bubbles or discontinuities in the flow of fluid through the cell, makes possible very close temperature control of the fluid entering the electrode chamber and control of the temperature of the electrodes, the chamber contents and adjacent chamber walls, and a cell the electrical output of which exhibits low sensitivity to changes in the rate of flow of fluid through the cell at flow rates greater than about two cubic centimeters per minute.

SUMMARY OF THE INVENTION

In accordance with applicants' invention there is provided an improved electrochemical cell including a plurality of electrodes having plane surfaces and separate means defining the active area of at least one of the electrodes. More specifically there is utilized a mask secured in fluid-tight relation with the plane surface of an electrode.

It is also an object of applicants' invention to provide an electrochemical cell with a plurality of electrodes having plane surfaces and means cooperating with the electrodes to form an enclosed space for the support of a fluid in contact with the electrodes. At least a portion of one of the electrodes forms one wall of the enclosed space and a heating means is disposed to heat the electrode and hence the wall.

It is further an object of our invention to provide an electrochemical cell comprised of body structure having wall portions defining an electrode cavity and wall portions defining a passage adjacent the cavity for the flow of fluid into the cavity with first heating means disposed in heat transfer relation with at least one of the wall portions defining the electrode cavity for control of the temperature of one of the electrodes and thereby the contents of the cavity. There is also second heating means disposed in heat transfer relation with at least one of the wall portions of the passage for control of the temperature of fluid in the passage to effect flow thereof into the cavity at a predetermined temperature.

It is still further an object of our invention to provide an electrochemical cell comprised of a stacked array of elements secured together in fluid-tight relation including a first element having a recess which in cooperation with a closure provided by a second element provides a cavity for containment of a salt bridge liquid. The first element additionally includes a recess containing a porous material which in cooperation with the second element is secured in fluid-tight relation in the recess. A passage in the first element conveys a salt bridge liquid from the cavity to a surface of the porous material, and means is provided to convey a fluid relative to the porous material in a manner to establish electrical connection between the fluid and a reference electrode disposed in the cavity by way of a path through the porous material and the salt bridge liquid.

In addition to the foregoing there is provided in accordance with applicants' invention an electrochemical cell comprised of a stacked array of elements secured together in fluid-tight relation with one another including a first element supporting a first electrode, a second element supporting a second electrode, a third element having a cut-out portion providing a portion of the wall structure of a cavity for containment of fluid for contacting the electrodes. The first element supporting the first electrode is disposed to one side of said third element so that the first electrode forms a portion of wall structure for the cavity. The second element supporting the second electrode is disposed to the other side of the third element so that the second electrode forms a portion of wall structure for the cavity, and there is a passageway through one of the elements for flow of fluid into the cavity.

For additional objects and for a more complete understanding of applicants' invention the following description and claims should be read with reference to the various figures of the drawings.

BRIEF DESCRIPTION OF THE DRAWINGS

In the accompanying drawings:

FIG. 3 is a side elevation of the near side of the cell of FIG. 1, FIG. 4 is a plan view of the top of the cell of FIG. 1, FIG. 5 shows the cell as viewed from the left end of FIG. 1, FIG. 6 is an enlarged sectional view along the line 6–6 of FIG. 4, FIG. 7 is an enlarged view of a portion of element 26 of FIG. 2 showing parts in place, FIG. 8 is a view showing the upper portion of element 26 of FIG. 2 as seen from the rear, FIG. 9 is a partial section along the line 9–9 of FIG. 1, FIG. 10 is a partial section along the line 10–10 of FIG. 1.

DESCRIPTION OF PREFERRED EMBODIMENT

Figure 1:
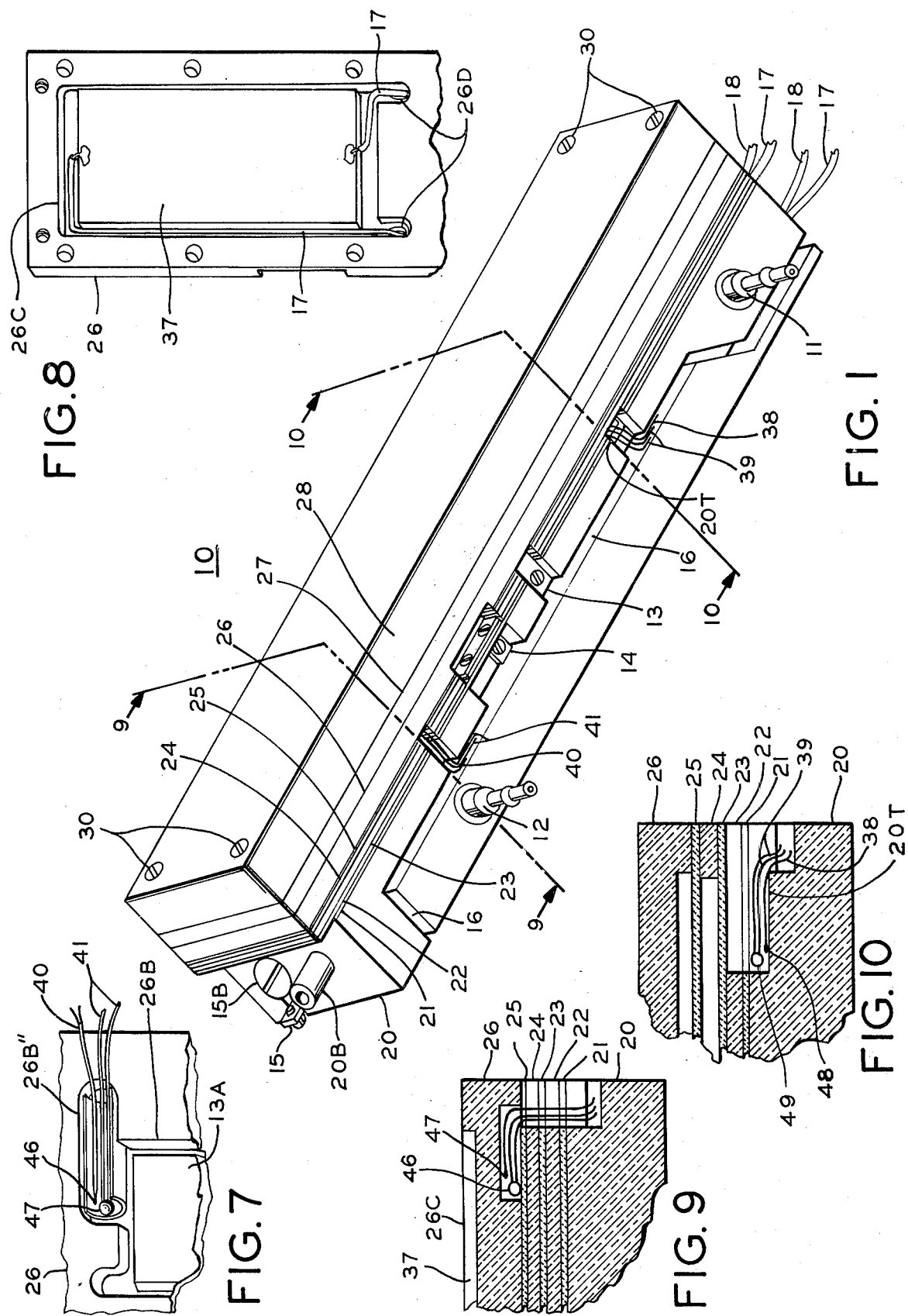
FIG. 1 is a perspective view of an electrochemical cell in accordance with applicant' invention.

In FIG. 1 there is shown a cell 10 having an inlet fitting 11 and an outlet fitting 12 each having an enlargement over which connection tubes may be fastened for the flow of fluid through the cell. Screw terminals 13, 14, and 15 are provided to affect electrical connections to an indicator electrode, a counter electrode, and a reference electrode respectively which are contained within the cell. A raceway 16 is provided in the form of a channel along the side of the cell to receive electrical leads for connection to the terminals 13, 14, and 15 in order to connect the cell to suitable measuring equipment not shown. Additionally raceway 16 will receive pairs of leads from temperature sensing devices contained within the cell. These leads are indicated at 38, 39, 40, and 41. Leadwires 17 and 18 which emerge from the lower end of the cell, that is to say the end disposed downwardly and to the right as viewed in FIG. 1, provide means for connecting heater elements contained within the cell to a source of power.

Cell 10 is of a layered construction comprising in stacked array a block 20, a gasket 21, a mounting plate 22 for a counter electrode, a gasket 23, a plate 24 containing a cut-out flow channel and cell chamber, a gasket 25, a mounting plate 26 for support of an indicator electrode and heating elements, a thick gasket 27 of heat insulating material such as cork and a thick, rigid, clamping plate 28. These elements are not drawn to scale, particularly gaskets 21, 23, and 25 which are shown many times their actual thickness so they can be seen. Elements 20–26 are held together as a subassembly by screws not shown in FIG. 1 and the subassembly and elements 27 and 28 are held together by screws 30. Screws 31 (rivets of course could be used) secure connection terminal 14 to a tab of a counter electrode and element 22 which supports the counter electrode.

Figure 2:
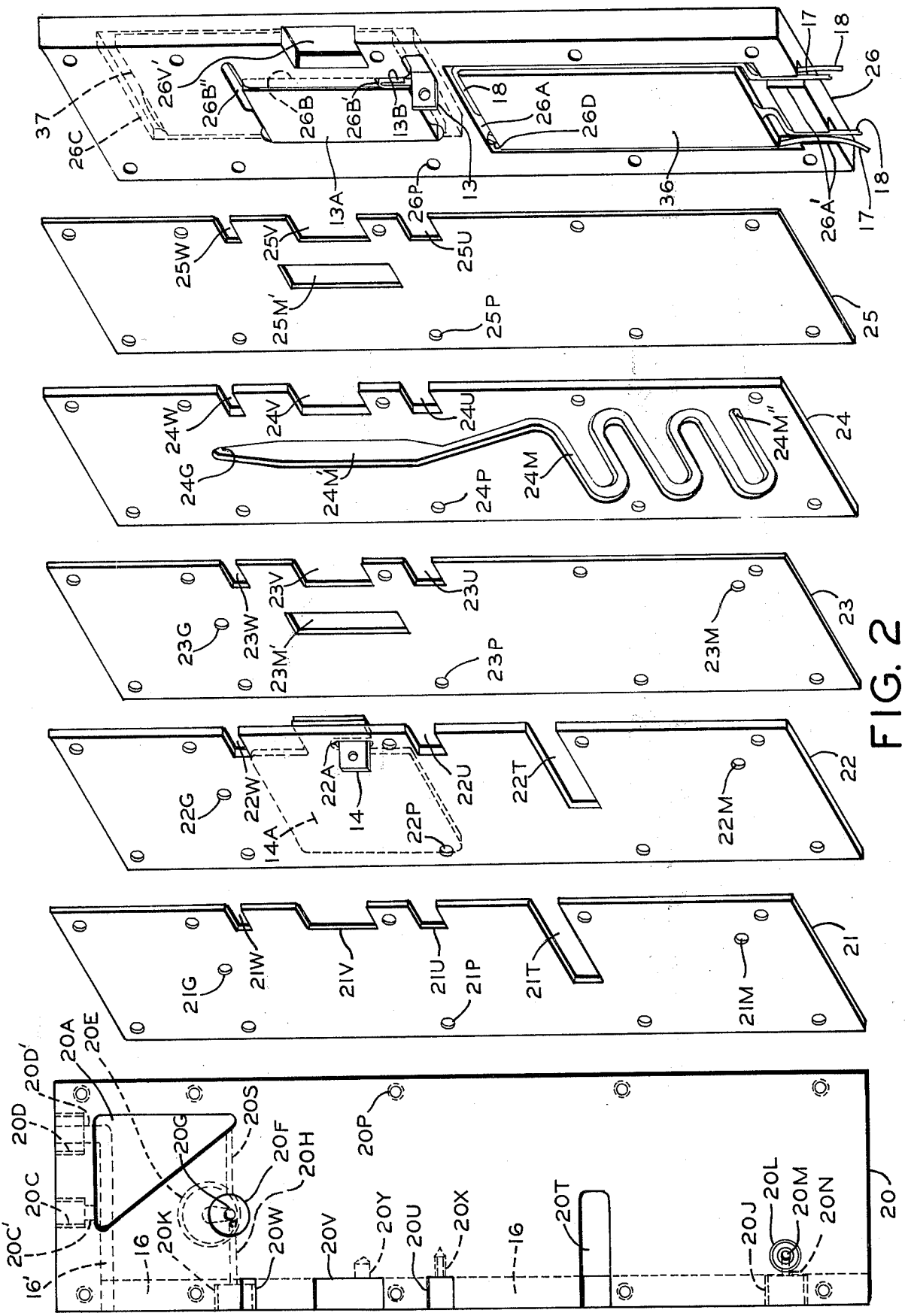
FIG. 2 is an exploded view showing in perspective elements of the stack of elements which comprise the cell of FIG. 1.

FIG. 2 is an exploded view of the cell 10 of FIG. 1 with elements 27 and 28 omitted. Referring to the element at the extreme left of FIG. 2 is element 20 of cell 10. It is a plan view of the reservoir block which is desirably made of a machineable or moldable plastic which is inert with respect to fluids passed through the cell and/or stored in the reservoir. A threaded counterbore 20J receives the inlet fitting 11 of FIG. 1 and connects with a blind hole 20N which intercepts a passage 20M formed by a hole at a right angle thereto to provide a continuation of the flow path from the entrance and form a portion of the flow path for passage of fluid through the electrochemical cell. An O-ring 20L is provided to effect a seal with the next element 21 of the stacked array of elements which form a cell subassembly when secured together. A plurality of blind tapped holes 20P are adapted to receive flat head screws 35 which secure the elements 20–26 in the stacked array. Only one of screws 35 is indicated near the lower end of FIG. 3 to avoid obscuring other features of the cell.

Still referring to FIG. 2 element 20 includes a triangular recess 20A, near the top, which when the open side is closed by element 21 serves as a reservoir for a suitable salt solution to connect a reference electrode electrically with fluid passing through the electrochemical cell by way of a salt bridge connection including a leak structure in the form of a doughnut-shaped piece of porous material, such as a porous ceramic, disposed in a counter bore 20F. The doughnut-shaped piece of porous material for the salt bridge connection is not per se shown in FIG. 2, however the use of such is well understood by those skilled in the art. A hole through the center of the piece of porous material will line up with the small end of the tapered hole 20G to form a portion of the flow passage for fluid flowing through the cell as best illustrated in FIG. 6 which shows in order from left to right a washer 42 of a resilient material such as rubber, a doughnut or washer shaped piece of porous ceramic 34 and another washer 44 of resilient material.

Referring now to the top of FIG. 2, a threaded counterbore 20C has a continuation 20C′ which connects with the reservoir 20A. As may be seen in FIGS. 1, 3, 4, and 5 a pipe 20B the lower end of which is threaded is inserted in the threaded counterbore 20C. A salt solution may be introduced into reservoir 20A through this pipe which additionally provides means for venting the reservoir. As shown in FIGS. 1, 3, and 4, pipe 20B extends well above the adjoining reference electrode terminal 15 to prevent short circuiting of the reference electrode by spillage of the salt solution. As shown in FIG. 2, a second counterbore 20D is connected by a passage 20D′ with the reservoir 20A this counterbore serves for mounting a reference electrode 15A as best shown in FIG. 4. The terminal 15 has a vertical portion which has a threaded hole to receive a screw for securing a connecting wire to the terminal and a flat washer shaped portion disposed at right angles thereto having a center hole into which is sealed the lead wire of a conventional reference electrode such as a silver-silver chloride reference electrode 15A. A washer 45 of resilient material is first placed in counterbore 20D, then terminal 15 with the electrode attached, and then a threaded plug 15B is screwed down tightly to prevent leakage. In order to minimize the use of dotted lines and the resulting confusion which would develop in the drawings, the dotted line representations of most screw holes and many parts are omitted from figures of the drawings where deemed unnecessary. The dotted line showing has only been included where deemed necessary for understanding the parts as they are being described. As shown best in FIG. 3, at the back of the block element 20, as viewed in FIG. 2, is a counterbore 20E closed by a plug 32 and sealed by means of an O-ring 33. As best shown in FIG. 6, counterbore 20E serves as a clean-out well and provides access for the formation of the tapered hole 20G which is an element of the flow passage of the cell connected to the exit fitting 12 of the cell by way of counterbore 20E, and a hole 20H′, shown in FIG. 6 and a hole 20H more clearly shown in FIG. 2. A hole 20S shown in FIG. 2 provides a passage for the flow of salt solution from the well 20A to the counter-bore 20F which is to contain the doughnut-shaped quantity of porous ceramic material mentioned above.

Still referring to FIG. 2, a recess 20T in the element 20 connects with raceway 16, at the left end, and in combination with slots 21T in element 21, 22T of element 22, and the closure effected by the absence of a slot in element 23 forms a well or pocket for the disposition of heat sensing devices 48 and 49 in the region of a fluid temperature stabilizing column 24M as shown in FIGS. 4 and 10. Continuing to refer to FIG. 2, recess 20U provides for passage of terminal 13 to the raceway 16 and a tapped hole 20X receives the screw of terminal 13 to secure it to element 20. Recess 20V provides an opening to receive the terminal 14 adjacent the raceway 16 and the counterbore 20Y is provided to receive the excess length of the screw of terminal 14. A recess 20W is provided to cooperate with slots 21W, 22W, 23W, 24W, and 25W respectively of elements 21–25 to define a passageway for connecting leads 40 and 41 to heat sensing devices 46 and 47 located in a pocket 26B'' of element 26 (as shown in FIG. 9) for sensing the temperature adjacent an indicator electrode 13A in a manner later to be described. Both of the cavities containing the heat sensing devices are packed with any of compounds known to those skilled in the art to effect good heat transfer between the heat sensing devices and the adjacent wall structures.

As illustrated two heat sensing devices are employed in each cavity. A thermocouple may be used as one heat sensor in each cavity. They would be connected to a temperature display device for an operator to monitor the temperature maintained in the region of each cavity. The other heat sensor in each cavity may, for example, be a thermistor connected in a control circuit with heating devices for maintaining the areas adjacent the heat sensing devices at a temperature determined by the settings of the controllers as selected by an operator. The heat sensing devices are disposed adjacent cell structure and not directly immersed in the fluid path in order to prevent an undesirable rise in temperature should liquid flowing through the cell be shut off and be replaced by still air which would be slower in reaching the temperature of the surrounding walls.

As shown in FIG. 2 element 21 is a thin gasket (shown thick for clarity) for providing a sealed leakproof closure for the reservoir 20A and the doughnut or washer shaped leak structure 34, shown in FIG. 6. This gasket includes a plurality of cut-away portions to mate with parts of element 20. It includes a plurality of holes 21P to line up with the screw holes 20P, a hole 21M (near the bottom) to line up with the flow passage 20M, a hole 21G (near the top) to line up with the hole contained in the center of the doughnut-shaped piece of porous material which is, in the completed assembly, contained in recess 20F, and slots 21T, 21U, 21V, and 21W to line up with the corresponding slots 20T-20W.

Element 22 is a plate of electrically insulating material such as is utilized for printed circuit boards or the like which is inert to the fluid to be passed through the cell. It supports the counter electrode 14A which may be in the form of a thin foil of a suitable metal fastened to element 22 as by a suitable adhesive. As shown in FIGS. 1 and 2 terminal 14 is comprised of an angle plate with a longer portion overlapping an extended portion of electrode 14A and, as shown in FIG. 1, secured to element 22 by means of screws 31. The terminal tab 14 extends through a slot 22A so that the terminal will be adjacent the raceway 16. Element 22 includes a plurality of holes 22P for passage of the screws which hold the subassembly together, a hole 22M which is a part of the entrance passage of the cell, and a hole 22G which is a part of the exit passage for flow of fluid from the cell. Additionally there are the slots 22T, 22U, and 22W which cooperate with mating slots of elements 20 and 21.

Element 23 is a thin gasket having a rectangular aperture 23M' which in cooperation with opening 24M' of element 24 and a corresponding rectangular aperture 25M' of element 25 serve as masks to delineate the active or participating areas of the electrodes 13A and 14A of the cell. As illustrated the apertures may be alike, however, if desired they may be different in size and shape to change electrical characteristics of the cell. Element 23 additionally includes a plurality of holes 23P for passage of assembly screws, a notch 23U for connector 13, a notch 23V to provide clearance for connector 14, a notch 23W which forms wall structure of the passage for the leads of the heat sensing devices disposed in recess 26B'' of element 26, a hole 23M which is a part of the inlet passage, and a hole 23G which is a part of the exit passage.

Element 24 is a rectangular plate having a cut-out portion 24M, a portion of which is in the form of a circuitous path beginning at 24M'' which leads to an enlarged area 24M' and terminates in an end 24G. When assembled in sealed relation with elements 23 and 25 which close both sides of the cut-out portion 24M in element 24 there is produced a column for the flow of fluid therethrough in series with a cavity for supporting a fluid in contact with electrodes 13A and 14A in face-to-face relation one on each side of element 24. The active areas of the electrodes are delineated by the masks provided by rectangular apertures 23M' and 25M' in elements 23 and 25. As may be observed with reference to FIGS. 1, 2, 3, 4, and 6 the inlet fitting 11, passages 20N and 20M, holes 21M, 22M, 23M in alignment with the lower end 24M'' of the cut-out 24M, the cut-out portion 24M (made into a passage and chamber by side walls comprised of elements 23 and 25), the upper end 24G of cut-out 24M and aligned holes 23G, 22G, 21G, the holes through details 42, 34, 44 (FIG. 6), conical passage 20G, counterbore 20E, passage 20H', passage 20H, and outlet fitting 12 a flow passage is established through the cell 10. Element 24 additionally includes a plurality of holes 24P to receive assembly screws thus to secure the elements 20–26 as a subassembly and the element additionally includes notches 24U, 24V, and 24W which cooperate with those already described to accommodate terminals 13, 14 and provide passage for wires from heat sensing elements to the raceway 16 in element 20.

Element 25 is identical to element 23 except for the omission of holes corresponding to holes 23M and 23G, hence further description of element 25 is deemed unnecessary since its use to provide a seal between elements 24 and 26 is deemed clear from the drawings.

Element 26 of the cell 10 is comprised of a block of substantial thickness having a recess 26A on the side of the block facing the reader. This recess is of a depth sufficient to form a pocket for reception of a heating element 36 and a pair of leads 18 for connecting the heating element to a source of power. A pair of grooves 26A' at the lower end of the block are provided for passage of heater leads out of the cell assembly. Heater 36 may be of any of many known types but preferably is of the thick film resistor type known to those skilled in the art. Such heaters are comprised of a base of ceramic with a deposited resistance so as to provide a heater of substantial area. Since the heaters per se are not applicants' invention and may be purchased from manufacturers of such equipment further description is deemed unnecessary. The near face of element 26 additionally has a rectangular recess 26B of a depth suitable to receive electrode 13A which is in the form of a rectangular, flat plate of suitable electrode material. The recess 26B also includes an additional cavity portion 26B' forming an extension of the cavity for reception of connector 13 having a spring 13B for securing the contact in good electrical connection with the electrode 13A and a cavity portion 26B'' for receiving heat sensing devices in close association with electrode 13A and the cavity portion 24M' which has already been described. FIG. 7 is an enlarged partial view of element 26 showing the position of the heat sensing devices 46 and 47 and the electrical leads 40 and 41 for these heat sensors.

Again referring to FIG. 2, element 26 additionally includes a plurality of holes 26P which are countersunk on the back or far side of element 26 for the reception of assembly screws 35 one of which is indicated in FIG. 3. A recess 26V' is provided in element 26 to make room for a portion of connector 14.

On the back side of element 26, as viewed in FIGS. 2 and 8, there is a recess 26C of dimensions adequate to receive a second heater element 37 and its leads 17. These leads are dressed beside the heater in cavity 26C and pass through holes 26D which connect with the cavity 26A on the opposite side of element 26 where the leads are passed down and around heater 36 and out through the grooves 26A'.

When all of the elements of FIG. 2 are secured in stacked array by means of a plurality of screws, such as screw 35, as shown in FIG. 3, and the heat insulating gasket 27 and mounting block 28 are secured as by screws 30 there is formed an electrochemical cell which is a rugged device suitable for use in both laboratory and industrial applications. Cells embodying features of applicants' invention have been constructed and tested. By way of example one such cell had an overall height of about 7½ inches, was about 2 inches wide and 1-13/16 inches thick. Elements 20, 24, and 26 were made of Lucite plastic. Elements 21, 23, and 25 were made of 0.002 inch thick Dupont Mylar plastic, and element 22 was fabricated from General Electric Co. G-10 fiber glass sheet. Element 24 was 1/32 inch thick, the cut-out portion had a maximum width of 3/16 inch and an overall length in the electrode cavity area of 1-29/31 inches. The flow passages through the cell, to and from the electrode cavity, had a cross-sectional area nominally equal to 1/16 inch diameter. Electrode 13A was made of vitreous carbon and electrode 14A was made of 316 stainless steel. The apertures 23M' and 25M' were 3/16 inch wide and 1 inch long. The heaters were of the thick film resistor type.

The cells were used for detection of $H_2O_2$ employing electrical circuit connections and components in a manner fully described in copending U.S. application Ser. No. 383,855 filed by Herman W. Levin, July 30, 1973. The cells were found to have an unusually short response time and the curve of input $H_2O_2$ vs output signal was almost linear. Also, the cells appeared to be substantially unaffected by gas bubbles and flow discontinuities.

Employing molded and punched parts the cells can be produced inexpensively.

While specific examples have been given with respect to some dimensions and materials it is to be understood that such is not intended to be limiting.

What is claimed is:

1. An electrochemical cell comprising
two electrodes,
a body structure supporting said electrodes in spaced relationship and having wall portions cooperating with said electrodes to define a fluid cavity, said body structure including wall portions defining a passage leading to said cavity for the flow of fluid through said passage into said cavity,
first heating means disposed in intimate heat transfer relation with at least one of said electrodes defining said cavity for control of the temperature of that electrode and the contents of said cavity, and
second heating means disposed in intimate heat transfer relation with at least one of said wall portions of said passage for control of the temperature of fluid in said passage to maintain a predetermined temperature in fluid flowing to said cavity.

2. An electrochemical cell comprising
a body structure formed by a stacked array of elements secured together in fluid-tight relationship and including two electrodes supported in spaced relationship to form with wall portions of said body a fluid cavity, said body structure including
a first element having a recess which in cooperation with a closure provided by a second element provides another cavity for containment of a salt bridge liquid, said first element additionally including a recess containing a porous material which in cooperation with said second element is secured in fluid-tight relation in said recess,
a reference electrode positioned in said other cavity,
a passage in said first element to convey a salt bridge liquid from said other cavity to a surface of said porous material, and
means to convey fluid from said first mentioned cavity to said porous material in a manner to establish electrical connection between said fluid and said reference electrode disposed in said other cavity by way of a path through said porous material and said salt bridge liquid.

3. An electrochemical cell comprising:
two electrodes having plane surfaces;
a body structure formed by a stacked array of elements secured together in fluid-tight relationship and arranged to support said electrodes in face-to-face relationship, said body structure including;
wall portions cooperating with said electrodes to define a fluid cavity,
other wall portions defining a passage leading to said cavity for flow of fluid through said passage into said cavity,
a first element having a recess, a second element cooperating with said recess to provide a closure for said recess to form another cavity for containment of a salt bridge liquid, said first element additionally including another recess containing a porous material which in cooperation with said second element is secured in fluid-tight relation in said other recess,
a reference electrode positioned in said other cavity,
another passage in said first element to convey a salt bridge liquid from said other cavity to a surface of said porous material, and
means to convey fluid from said first mentioned cavity to said porous material in a manner to establish electrical connection between any fluid passing through said first mentioned cavity and said reference electrode disposed in said other cavity, said connection being by way of a path through said porous material and said salt bridge liquid;

first heating means disposed in intimate heat transfer relation with at least one of said electrodes defining said first mentioned cavity for control of the temperature of that electrode and the contents of said first mentioned cavity; and second heating means disposed in intimate heat transfer relation with at least part of said wall portion of said passage for control of the temperature of fluid in said passage to maintain a predetermined temperature in fluid flowing to said first mentioned cavity.

* * * * *